Nov. 3, 1953     P. F. BORTH     2,657,611
DOT COMPARATOR
Filed June 13, 1952
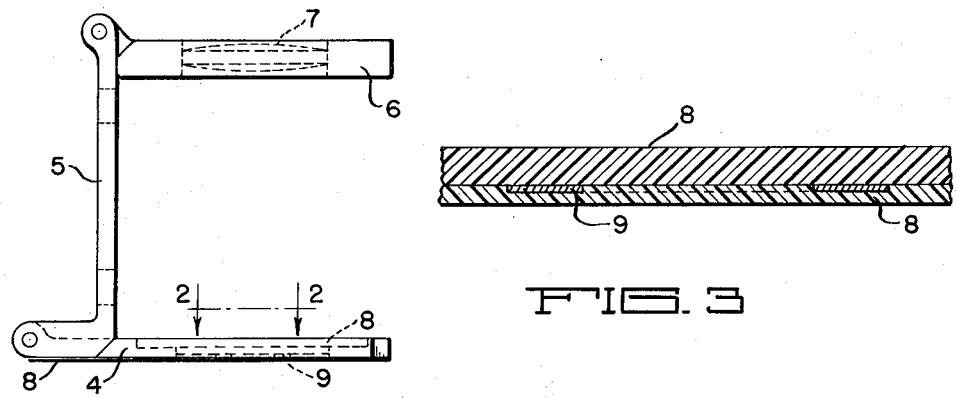
INVENTOR.
Paul F. Borth
BY
Schroeder, Merriam,
Hofgren & Brady
Attorneys Patented Nov. 3, 1953

2,657,611

UNITED STATES PATENT OFFICE 2,657,611

DOT COMPARATOR

Paul F. Borth, Park Forest, Ill., assignor to R. R. Donnelley & Sons Company, a corporation of Illinois Application June 13, 1952, Serial No. 293,365

1 Claim. (Cl. 88—14)

This invention relates to an instrument for estimating printed half-tone dot areas, and more particularly to an instrument for photoengravers making direct comparisons between a portion of the engraving under consideration and a photographic image of a series of half-tone dots of a size and spacing used on printing plates.

The primary object of the invention is to provide an instrument having a fixed magnifying glass by which practical estimation of half-tone dot areas can be made more easily and accurately than with other methods available to a photoengraver.

The invention is illustrated in a preferred embodiment in the accompanying drawings, in which—

Fig. 1 is a side elevational view of a dot comparator embodying the invention; Fig. 2 a fragmentary plan view, on a large scale, of the image which is mounted in the base of the instrument; and Fig. 3 a fragmentary sectional view, taken as indicated at line 3—3, of Fig. 2.

In the embodiment illustrated a conventional magnifying device, similar to a linen tester magnifier, is shown with a base 4 hinged to a supporting upright 5 provided with a hinged top member 6 in which is mounted a magnifying glass 7. The base is provided with a transparent window pane 8, made of glass or plastic material in which an annular photographic image 9 is imbedded.

The image is made up photographically of one inch squares 10, each showing the appearance of four etched dots in a given area. These squares are arranged in a circle with a second surrounding ring of squares 11 having dot patterns corresponding to shapes observed before etching. Preferably the squares vary in 5% steps from 5 to 95% of plate area. Numbers are shown without a final zero so that the number "1" indicates 10%, "5" 50%, etc.

The image is reduced photographically in two steps, resulting in a final positive image 9, having a diameter of about ¼ inch on "Kodalith" paper. Thus the spacing of the dots in the squares corresponds to about 115 lines per inch.

The black areas in the center and those surrounding the ring are cut away. The image 9 is then imbedded in the window pane 8 so that its center portion provides a sight opening at about the focal center of the magnifying glass 7. The image may be mounted between two thin sheets of glass but preferably it is imbedded in transparent plastic material so that it lies as close as possible to the plane of the surface of the subject being examined.

In using the device it has been found that individuals who are inexperienced in the measurement of dot areas are able to arrive at results which are quite accurate and are in good agreement with each other and with data obtained by measuring the dot diameters with a microscope and computing the areas. The instrument is merely placed on the subject to be examined and the operator selects the number that is nearest to the square which appears to be the same as the subject viewed through the sight opening.

The foregoing detailed description is given for clearness only and no unnecessary limitations should be understood therefrom, for some modifications will be obvious to those skilled in the art.

I claim:

A dot comparator for estimating printed half-tone dot areas, comprising: a frame having a base, a magnifying glass mounted in said frame so as to be focused near the bottom of said base, and an annular photographic image of a progressively graded series of half-tone dots having a size and spacing used on printing plates, said image being imbedded in transparent material mounted in the base so that the center of the image is a sight opening near the focal center of said magnifying glass.

PAUL F. BORTH.

References Cited in the file of this patent

UNITED STATES PATENTS

| Number | Name | Date |
| --- | --- | --- |
| 1,135,919 | Pilkington | Apr. 13, 1915 |
| 1,145,959 | Amstutz | July 13, 1915 |
| 1,702,317 | Rose | Feb. 19, 1929 |
| 2,048,879 | Moran | July 28, 1936 |
| 2,149,487 | Zilberman et al. | Mar. 7, 1939 |
| 2,619,004 | O'Brien et al. | Nov. 25, 1952 |